(12) United States Patent
Endoh et al.

(10) Patent No.: US 9,627,145 B2
(45) Date of Patent: Apr. 18, 2017

(54) ELECTROLYTIC CAPACITOR FOR USE IN A CHARGE/DISCHARGE CIRCUIT WITH SHORTER PERIOD AND GREATER VOLTAGE DIFFERENCE

(71) Applicant: NIPPON CHEMI-CON CORPORATION, Tokyo (JP)

(72) Inventors: Fusayoshi Endoh, Tokyo (JP); Kentaro Nakaaki, Tokyo (JP); Masashi Ozawa, Tokyo (JP); Koichi Yoshida, Tokyo (JP); Osamu Nakamura, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 71 days.

(21) Appl. No.: 13/947,387

(22) Filed: Jul. 22, 2013

(65) Prior Publication Data
US 2013/0301189 A1    Nov. 14, 2013

Related U.S. Application Data

(63) Continuation of application No. 12/093,514, filed as application No. PCT/JP2006/322746 on Nov. 15, 2006, now abandoned.

(30) Foreign Application Priority Data

Nov. 15, 2005  (JP) .................................. 2005-330912
Sep. 30, 2006  (JP) .................................. 2006-270151

(51) Int. Cl.
*H01G 9/045*   (2006.01)
*H01G 9/055*   (2006.01)
(Continued)

(52) U.S. Cl.
CPC ............. *H01G 9/045* (2013.01); *H01G 9/008* (2013.01); *H01G 9/055* (2013.01); *H01G 9/145* (2013.01)

(58) Field of Classification Search
CPC ........ H01G 9/045; H01G 9/008; H01G 9/145; H01G 9/055
See application file for complete search history.

(56) References Cited

U.S. PATENT DOCUMENTS

2,288,157 A   6/1942  Dunleavey
4,031,436 A   6/1977  Alwitt
(Continued)

FOREIGN PATENT DOCUMENTS

JP   48-34035    4/1973
JP   4-361517    12/1992
(Continued)

OTHER PUBLICATIONS

Machine translation of JP20000150307A.

*Primary Examiner* — David M Sinclair
(74) *Attorney, Agent, or Firm* — Young & Thompson

(57) ABSTRACT

An electrolytic capacitor according to the present invention employs a capacitor element wherein an anode foil having an anode internal terminal and a cathode foil having a cathode internal terminal are wound or laminated through a separator. The end of the anode foil faces with the cathode foil through the separator and the surface area of the cathode internal terminal is provided with an enlargement treatment, whereby the small area portion of the cathode foil that faces with the anode foil is eliminated, and the charge/discharge characteristics are thus improved. Furthermore, in the electrolytic capacitor provided with the capacitor element wherein the anode foil having the anode internal terminal and the cathode foil having the cathode internal terminal are wound or laminated through the separator, the capacitor element being impregnated with an electrolyte, the cathode internal terminal is composed of an aluminum material, the surface of the cathode internal terminal is etched and the (Continued)

concentration of iron in the etching layer is less than 300 ppm.

12 Claims, 3 Drawing Sheets

(51) Int. Cl.
   *H01G 9/145* (2006.01)
   *H01G 9/008* (2006.01)

(56) References Cited

U.S. PATENT DOCUMENTS

| | | | |
|---|---|---|---|
| 4,479,166 | A | 10/1984 | Finkelstein et al. |
| 4,480,290 | A | 10/1984 | Constanti et al. |
| 5,157,586 | A | 10/1992 | Lallemand |
| 5,448,448 | A | 9/1995 | Fujiwara et al. |
| 6,104,600 | A | 8/2000 | Suhara et al. |
| 6,307,733 | B1 | 10/2001 | Maruyama et al. |
| 6,558,436 | B1 * | 5/2003 | Greenwood, Jr. ..... H01G 9/055 29/25.03 |
| 6,839,222 | B2 | 1/2005 | Takaoka et al. |
| 6,845,003 | B2 * | 1/2005 | Oyama ............... H01G 9/016 29/25.03 |
| 6,876,541 | B1 | 4/2005 | Kato et al. |
| 2002/0080559 | A1 | 6/2002 | Nonaka et al. |
| 2005/0117276 | A1 | 6/2005 | Liu et al. |

FOREIGN PATENT DOCUMENTS

| | | |
|---|---|---|
| JP | 07173562 | 7/1995 |
| JP | 8-8146 | 1/1996 |
| JP | 08144030 | 6/1996 |
| JP | 8-213288 | 8/1996 |
| JP | 2000-150307 | 5/2000 |
| JP | 2000-277384 | 10/2000 |
| JP | 2001-203127 | 7/2001 |
| JP | 2005-039132 | 2/2005 |
| JP | 2005-167246 | 6/2005 |
| JP | 2005-294339 | 10/2005 |

* cited by examiner

Prior Art

ELECTROLYTIC CAPACITOR FOR USE IN A CHARGE/DISCHARGE CIRCUIT WITH SHORTER PERIOD AND GREATER VOLTAGE DIFFERENCE

CROSS REFERENCE TO RELATED APPLICATIONS

This application is a continuation of application Ser. No. 12/093,514 filed on May 13, 2008, which is a National Stage of PCT/JP2006/322746 filed on Nov. 15, 2006, which claims foreign priority to Japanese Application Nos. 2005-330912 and 2006-270151 filed on Nov. 15, 2005 and Sep. 30, 2006 respectively. The entire contents of each of the above-identified applications are hereby incorporated by reference.

BACKGROUND OF THE INVENTION

The present invention relates to an aluminum electrolytic capacitor.

Conventional aluminum electrolytic capacitor, as depicted in FIG. 4, comprises a capacitor element 1, wherein an anode foil 4 having a chemical formed coating on an etching foil made of aluminum and a cathode foil 3 made of an etched aluminum are wound through a separator 2 such as an insulating paper. An anode internal terminal 6 and a cathode internal terminal 5, both having an elongated shape, are connected to said anode and cathode foils 4 and 3, respectively, by way of stitch and cold welding etc. Said capacitor element 1 is impregnated with an electrolyte, and is housed in an outer casing having a tubular shape with a bottom cover. An opening of the outer casing is encapsulated with a sealing member, and the positive/negative internal terminals are connected to the positive/negative external terminals, respectively, each terminal extending from the capacitor element by means of a rivet disposed on said sealing member, whereby an electrolytic capacitor is formed.

When a conventional capacitor is used in a charge/discharge circuit, higher voltage is applied to said negative internal terminal 5 than to the negative foil 3, because the surface area of the negative internal terminal 5 is smaller than that of the negative foil 3. On account of this, there is a possibility that at the time of discharge, such products as hydrogen gas may be generated at said negative internal terminal 5 and the negative foil 3 around the terminal 5 as the film generation reaction develops; and that this generation of hydrogen gas may bring about higher internal pressure of the capacitor, causing such a trouble as activation of an explosion-proof valve.

A conventional invention directed to improvement the aforementioned problem has a configuration in which a surface, facing a positive separator, of a negative internal terminal 5 connected to a negative foil 3 is roughened and in which a surface of the terminal 5, facing the negative foil 3, is flattened.

Patent Document 1: Japanese Laid-open Patent Publication No. 2005-39132

Today, however, an aluminum electrolytic capacitor for use in a servomotor etc. has a shorter charge/discharge period and such voltages are applied that charge/discharge voltage difference is greater. Another problem has occurred in such a use, e.g. short circuit, as well as activation of safety valve.

The present invention is proposed for solving the above-mentioned problems relating to conventional electrolytic capacitors, and is directed to achieve longer durability of an electrolytic capacitor for use in a charge/discharge circuit with shorter period and greater voltage difference.

As part of extensive research for solving the above-mentioned problems, the present inventors carried out an analysis of an electrolytic capacitor having a short circuit in order to figure out the cause of the short circuit that occurs during usage of the electrolytic capacitor carrying a charge/discharge circuit, and found that an iron portion was exposed on the surface of the negative internal terminal. This phenomenon can be identified in terms of electrochemical mechanism by the fact that at the time of charging, the electrolyte around a cathode foil and a cathode internal terminal is alkalized by means of the reduction reaction of oxygen and water and the reduction reaction of hydrogen, where, under a condition that a lot of charge current flows such as usage of an electrolytic capacitor installed in a charge/discharge circuit with great voltage difference, the above-stated reduction reaction frequently occurs, which significantly affects the alkalization of the electrolyte around the cathode foil and the cathode internal terminal. The reduction reaction occurs on the entire surface of the cathode internal terminal if the content of dissimilar metal contained in the cathode internal terminal is evenly distributed on the entire area thereof; whereas the reduction reaction occurs intensively in the interface between the dissimilar metal and the electrolyte if there are some areas of the cathode internal terminal intensively containing dissimilar metal. In a conventional cathode internal terminal, a less fine aluminum material is usually employed because the terminal is too soft to have a stable connection to the cathode foil, and too expensive to produce, in comparison with a fine aluminum material (with degree of purity being 99.99% or greater, for example). Accordingly, because the content of dissimilar metal, in particular, iron metal, in a cathode internal terminal is greater than that in a cathode foil, a reduction reaction of iron contained in the cathode internal terminal and the electrolyte at the interface between the terminal and the foil frequently occurs, leading to alkalization of the electrolyte around the cathode internal terminal. This causes the oxide film and aluminum on the surface of the cathode internal terminal to dissolve, leading to exposure of iron which is a dissimilar metal contained in the cathode internal terminal, whereby the current intensifies on the iron, which generates a short circuit.

It has been discovered by the applicants of the present invention that a short circuit can be prevented by using these parts with the dissimilar metal adjacent to the surface of the cathode internal terminal being significantly reduced in amount, finally leading to the achievement of the present invention.

It has also been discovered that a great amount of dissimilar metal exists not only in the cathode internal terminal but also in the volute tongue of the capacitor element and in the proximity of the cathode internal terminal. Besides, it has been found that when the anode foil firstly starts being wound and then the cathode foil is wound together, a short circuit occurs at a portion of the anode foil facing the end of the cathode foil and at a portion of the anode foil facing the cathode internal terminal. It has further been discovered that a short circuit occurs after the charge/discharge voltage is applied when the charging is finished. The configuration of an electrolytic capacitor is now considered. An oxide film of an anode foil functions as a dielectric material, and an electric charge is accumulated between the oxide film and the cathode foil facing therewith, thus forming a capacitor. If a portion of the anode foil does not face with any portion of the cathode foil, or if the portion of the anode foil faces with only a small area of the cathode foil, the electric charge on the anode foil concentrates either on the portion thereof closest to such portions of the cathode foil or on the portion thereof facing with the small area of the cathode foil. In addition, it has been supposed that the chemical formed coating is degraded by means of a charge/discharge application under unprecedentedly severe conditions, and that a great voltage is further applied to the chemical formed coating with the electric charge being maximally accumulated after the charging is finished, whereby a short circuit is generated. To be more specific, when the anode foil firstly starts being wound and then the cathode foil is wound together, the end portion of the anode foil does not face with any portion of cathode foil; wherein all the electric charge on the end of the anode foil not facing with any portion of the cathode foil concentrates on the portion of the anode foil facing the end of the cathode foil, leading to a short circuit. On the other hand, a small and flat cathode internal terminal faces with a portion of the anode foil, on which the electric charge concentrates, leading to a short circuit. The discussion rendered above is a consideration of an electrolytic capacitor using an electrolyte designed for driving an electrolytic capacitor; however, a similar behavior can be conceived with respect to an electrolytic capacitor using a solid electrolyte.

SUMMARY OF THE INVENTION

The present inventors have thus focused on enlargement of the portion of the cathode foil facing the anode foil, which is the very object of the present invention.

The inventive electrolytic capacitor provided with a capacitor element in which an anode foil having an anode internal terminal and a cathode foil having a cathode internal terminal are wound or laminated through a separator, the capacitor element being impregnated with an electrolyte, is characterized in that the surface of said cathode internal terminal is comprised of a lysis-treated aluminum, and that the iron concentration in the lysis-treated layer formed through said lysis treatment is less than 300 ppm. The inventive electrolytic capacitor is further characterized in that said lysis treatment is an etching treatment.

Hence, the lysis treatment (the etching treatment) causes the surface of the cathode internal terminal to dissolve, and the iron concentration in the lysis-treated layer (the etching layer) is thus limited in a certain range. This allows the area adjacent to the surface of the lysis-treated layer (the etching layer) to retain a significantly reduced amount of iron, and a short circuit attributable to this iron can thereby be prevented. In other words, in a 99.9%-pure aluminum alloy, the aluminum is in a multi-crystal state; hence, the iron that exceeds the solubility limit is segregated to the aluminum crystal interface. Other impurity components are also segregated to the crystal interface. When a lysis treatment such as an etching is provided to such an aluminum alloy, the solution rate is greater at the aluminum crystal interface than at the aluminum crystal portions due to the local cell action caused by iron or other impurity components. The quicker progress of solution at the crystal interface allows the iron segregated to the crystal interface to come off easily. When seen from a macroscopic standpoint, in these actions, an etching causes the iron to selectively come off, and the iron concentration in the etching layer of the cathode internal terminal is reduced, or at least, the iron that is exposed to the area adjacent to the surface of the etching layer becomes quite rare. The iron concentration in said lysis-treated layer (the etching layer) is preferably less than 300 ppm, and most preferably, less than 40 ppm.

Further, the electrolytic capacitor according to the present invention has a capacitor element in which an anode foil having an anode internal terminal and a cathode foil having a cathode internal terminal are wound or laminated through a separator, wherein the end of the anode foil faces with the cathode foil through a separator, and wherein the surface area of the cathode internal terminal is provide with an enlargement treatment. In the inventive electrolytic capacitor mentioned above, the end of the anode foil faces with the cathode foil through a separator, and the end of the anode foil faces with the cathode foil, causing no electric charge concentration. Further, the cathode internal terminal is provided with an enlargement treatment, whereby the surface area of the cathode internal terminal that faces with the anode foil is enlarged. These features allow the anode foil to have no electric charge concentration at any portion thereof, and the charge/discharge characteristics are thus improved.

Besides, in the electrolytic capacitor according to the present invention provided with a capacitor element in which an anode foil having an anode internal terminal and a cathode foil having a cathode internal terminal are wound through a separator, the cathode foil firstly starts being wound and then the anode foil is wound together, and the surface of the cathode internal terminal is provided with an enlargement treatment. The cathode foil firstly starts being wound and then the anode foil is wound together, and the end of the cathode foil comes at the winding end portion, whereby the cathode foil faces with the end of the anode foil. When the foils are wound together with the anode foil being arranged inward, the winding start end of the anode foil does not face with the cathode foil in the inward direction; however, the winding start end of the preceding cathode foil is actually involved to face with the winding start end of the anode foil. This configuration can prevent the electric charge concentration, resulting in enhanced charge/discharge characteristics.

In the electrolytic capacitor provided with the capacitor element in which the anode foil having the anode internal terminal and the cathode foil having the cathode internal terminal are wound or laminated through the separator, the entire surface of the anode foil faces with the cathode foil through the separator, and the surface of the cathode internal terminal is provided with an enlargement treatment. This enables the entire surface of the anode foil, not limited to the end thereof, to face with the cathode foil, resulting in further enhanced charge/discharge characteristics.

In the electrolytic capacitor according to the present invention, when the cathode internal terminal the surface of which is enlarged is jointed onto the cathode foil, a welding method is employed such as cold welding that does not give any damage on the surface of the cathode. In the conventional method of jointing, an electrode foil and an internal terminal are stacked, and a needle-shaped drilling tool is thrust onto the stack, and then the foil and the terminal are squashed for their jointing. This method causes the cut surface of the electrode foil and the internal terminal to be exposed. In such a method, some portion is not provided with an enlargement treatment, giving rise to some small portions on the cathode foil facing with the anode foil. The effect of the present invention is thus significantly impaired, whereby this method is not preferred.

When an electrolytic capacitor in which the end of the anode foil faced with the cathode foil through a separator and in which the surface of the cathode internal terminal was not enlarged was compared with an electrolytic capacitor in which the end of the anode foil did not face with the cathode foil through a separator and in which the surface of the cathode internal terminal was enlarged, it turned out that the charge/discharge characteristics of the former were better. This demonstrates that the area facing with the anode foil is smaller in case of the end of the cathode foil than in case of the cathode internal terminal provided with no enlargement treatment.

As stated above, in the electrolytic capacitor according to the present invention, the effect of the present application is achieved by the configuration in which the portion of the anode foil where electric charge concentration is likely to occur is arranged to face with the cathode foil, and in which no small area of the cathode foil exists.

The electrolytic capacitor according to the present invention is characterized in that the degree of purity of aluminum of said cathode internal terminal is 99.9% or greater. In this case, by using high purity aluminum in the cathode internal terminal, the iron content in the cathode internal terminal is reduced in advance and the iron concentration in the area adjacent to the surface of the lysis-treated layer is reduced, whereby a short circuit can be prevented.

Besides, the electrolytic capacitor according to the present invention is characterized in that said cathode internal terminal has a chemical formed coating thereon. In this case, by covering the surface of the cathode internal terminal with a chemical formed coating, the reduction reaction of the iron remaining around the surface of said cathode internal terminal is restricted within the electrolyte, resulting in effective prevention of alkalization around the cathode internal terminal.

The electrolytic capacitor according to the present invention is characterized in that an etching treatment is provided to said cathode foil, and that the etching magnification of the cathode internal terminal is greater than that of the cathode foil by at least 70%. In this case, by increasing the electrostatic capacity of the cathode internal terminal, the concentration of the electrical power onto the cathode internal terminal is reduced, whereby the alkalization around the cathode internal terminal can be restricted.

The electrolytic capacitor according to the present invention is characterized in that the pH range of said electrolyte is from 5 to 7. In this case, by rendering the pH of the electrolyte to be in the range of mild acidity, the alkaline state generated around the cathode internal terminal can be restricted by way of neutralization.

The electrolytic capacitor according to the present invention is characterized in that a low-density plane of said separator is arranged to face with said cathode internal terminal. In this case, the low-density plane of said separator has a great capacity to retain the electrolyte, and sufficient supply of the electrolyte to the area adjacent to the cathode internal terminal can thus be ensured, whereby the alkalization around the cathode internal terminal can be restricted.

Using a separator that comprises kraft, hemp or cotton, the capacity of the separator to retain the electrolyte is further enhanced so that sufficient supply of the electrolyte to the area adjacent to the cathode internal terminal can thus be ensured, whereby the alkalization around the cathode internal terminal can be restricted.

Using an electrolyte containing amine salt, the film characteristics of the chemical formed coating are improved; especially improved are the film characteristics for charge/discharge with great voltage difference.

Using such an anode foil having a chemical formed coating comprised of an evenly crystallized layer formed on the aluminum and a silicon-containing layer formed on the evenly crystallized layer, the film characteristics of the chemical formed coating are further improved; especially improved are the film characteristics for charge/discharge with great voltage difference.

The present invention, when used in a charge/discharge circuit with shorter period and greater voltage difference, can prevent a short circuit that originates around the cathode internal terminal in an electrolytic capacitor and can also achieve longer durability of an electrolytic capacitor by significantly reducing the dissimilar metal adjacent to the surface of the cathode internal terminal.

Further, the end of the anode foil faces with the cathode foil through a separator, and the surface area of the cathode internal terminal is provided with an enlargement treatment, whereby the end of the cathode foil does not face with any portion of the anode foil, and further, the surface area of the cathode internal terminal that faces with the anode foil is enlarged. Owing to these features, no small portion in the cathode foil that faces with the anode foil remains unexpanded, whereby the charge/discharge characteristics are enhanced.

DETAILED DESCRIPTION OF THE INVENTION

Embodiment 1

Figure 1:
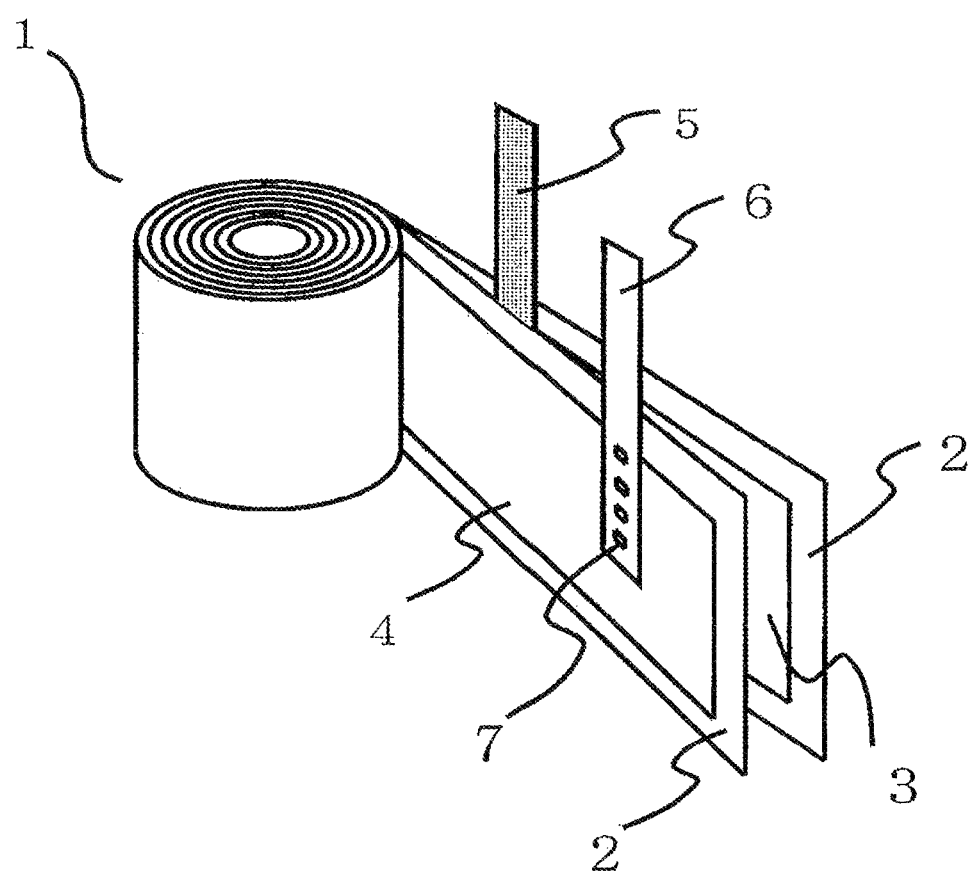
FIG. 1 is a perspective view of the electrolytic capacitor in the embodiment of the present invention.
Figure 2:
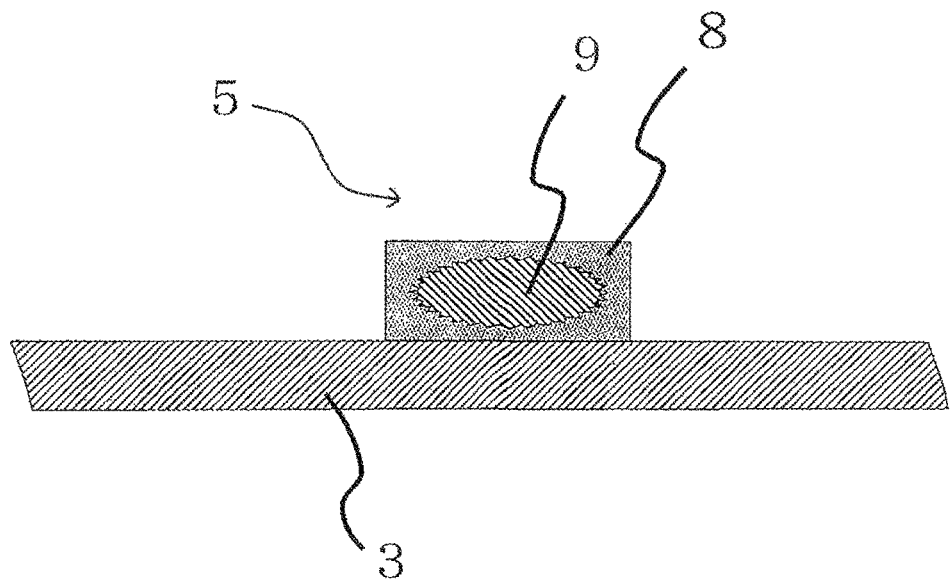
FIG. 2 is a cross-sectional view of the cathode internal terminal in the embodiment of the present invention.
Figure 3:
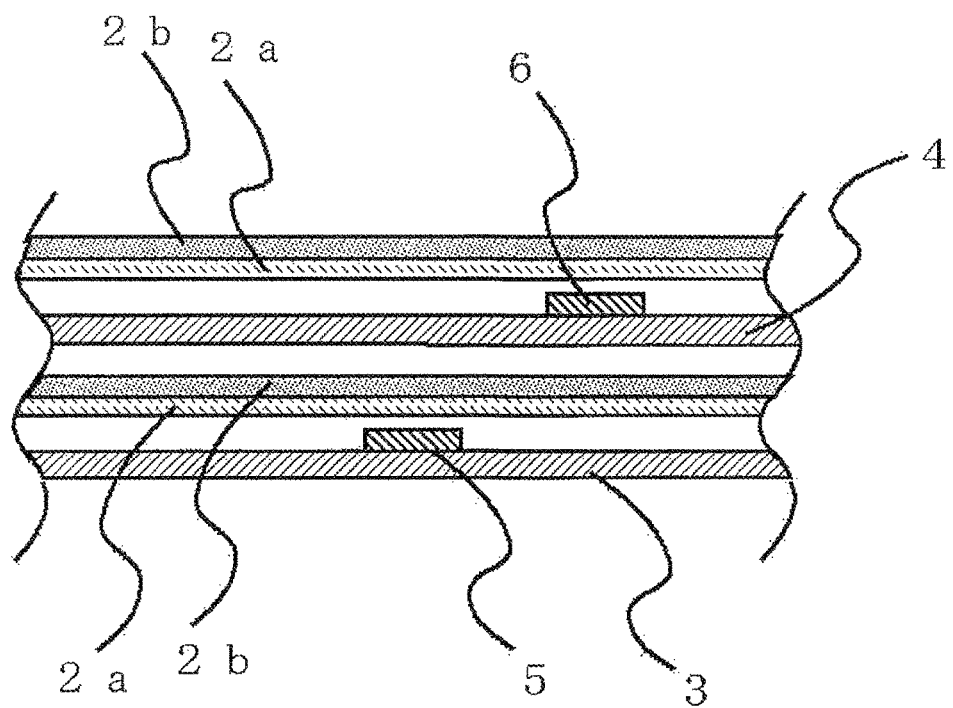
FIG. 3 is a cross-sectional view of the arrangement of the cathode foil, the anode foil and the separator of the electrolytic capacitor in accordance with the embodiment of the present invention.
Figure 4:
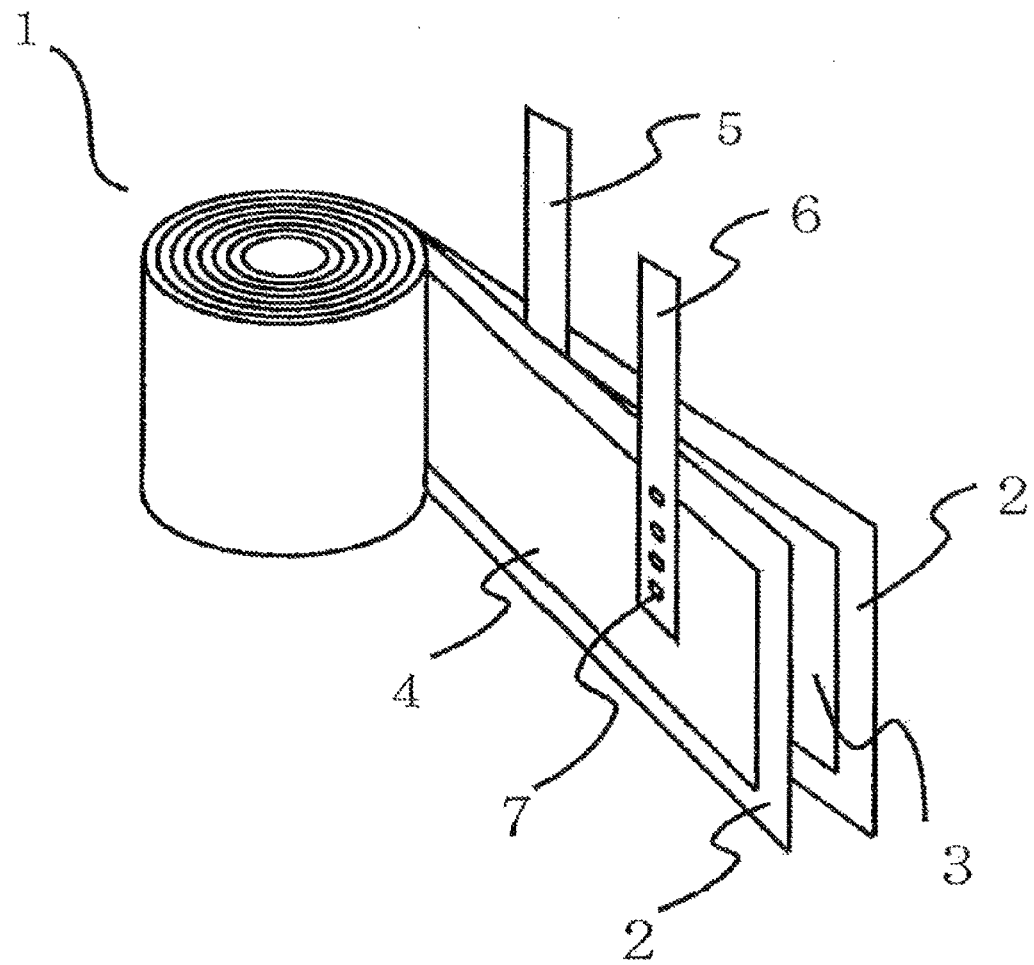
FIG. 4 is a perspective view of the conventional aluminum electrolytic capacitor.

A detailed explanation of the Embodiment 1 will be given with reference to the drawings. FIG. 1 is the electrolytic capacitor in accordance with the embodiment of the present invention. FIG. 2 is a cross-sectional view of the cathode internal terminal in the embodiment of the present invention. FIG. 3 is a cross-sectional view of the arrangement of the cathode foil, the anode foil and the separator of the electrolytic capacitor in accordance with the embodiment of the present invention.

As shown in FIG. 1, in the electrolytic capacitor according to the present example, the anode foil 4 comprises an aluminum foil that is etched to have a chemical formed coating, while the cathode foil 3 comprises an aluminum foil that is etched to optionally have a chemical formed coating. Each of these two electrode foils has an interface section 7 welded thereto by way of stitching and cold welding methods, where the interface section 7 is a part of an electrode internal terminal comprising, for example, an internal tab terminal made of aluminum etc. and having an elongated foil shape, and a lead terminal comprising a round bar section, a flattened section and a leading section connected to said round bar section. Said anode foil 4, said cathode foil 3 and a separator 2 placed therebetween are wound or laminated to form a capacitor element 1.

As shown in FIG. 2, said cathode internal terminal 5 comprises aluminum, with the degree of purity being 99% or greater. The surface of the cathode internal terminal 5 is treated by way of alternating current etching, and further, a chemical formed coating is formed thereon by way of anodic oxidation treatment. The etching layer 8 as depicted in FIG. 2 comprises the etched portion and the chemical formed coating formed thereon, whereas the cored bar section 9 comprises the aluminum portion not provided with said etching treatment.

Preferably, the multiplying factor of etching for the cathode internal terminal 5 is nearly equal to that for the cathode foil 3. More preferably, the multiplying factor of etching for the cathode internal terminal 5 is 70% or greater than that for the cathode foil 3, because in that case, the voltage applied to the cathode internal terminal 5 at the time of charge/discharge is reduced so that the progress of alkalization around the cathode internal terminal 5 is suppressed. Still more preferably, the anodic oxidation treatment voltage applied to the cathode internal terminal 5 is nearly equal to that applied to the cathode foil 3. It is thus preferable that the etching magnification, the anodic oxidation treatment voltage and the material of the cathode internal terminal 5 are nearly equal to those of the cathode foil 3.

As regards the cathode internal terminal 5 according to the present Embodiment, the aluminum material containing dissimilar metals such as iron and copper is etched in advance so that the dissimilar metals such as iron and copper contained in the portion of the cathode internal terminal 5 close to the surface of the etching layer are dissolved and eliminated, and so that the portion close to the surface of the etching layer contains extremely small amount of the dissimilar metals, whereby the progress of alkalization around the cathode internal terminal 5 at the time of charge/discharge is suppressed. By way of the etching treatment, the content of iron in the etching layer 8 of the cathode internal terminal 5 is preferably less than 300 ppm, and most preferably, less than 40 ppm.

The anode internal terminal 6 comprises aluminum, and a chemical formed coating is formed on the surface thereof by way of anodic oxidation treatment. Preferably, the anodic oxidation treatment voltage applied to the anode internal terminal 6 is nearly equal to that applied to the anode foil 4.

The separator 2 comprises cellulose fiber paper, mixed paper including the cellulose fiber paper, and laminated paper; where the cellulose fiber paper includes at least one material selected from the group consisting of Manila fiber, kraft, hemp, esparto and cotton. The papermaking process causes the separator to have different forms in the front and back surfaces thereof: one surface is formed flat (high-density side 2b) and the other surface is formed concavo-convex (low-density plane 2a). In the conventional electrolytic capacitors, the high-density side 2b of the separator 2 is arranged to face with said anode internal terminal 6 in order to prevent generation of burrs on the anode internal terminal 6; while in the present invention, the low-density plane 2a of the separator 2 having a great capacity to retain the electrolyte is arranged to face with said cathode internal terminal 5 so that the electrolyte can be supplied to the proximity of said cathode internal terminal 5, whereby alkalization is suppressed. The examples of material for the separator include synthetic resins such as polyethylene terephthalate, polybutylene terephthalate, polyphenylene sulfide, nylon, aromatic polyamide, polyamide, polyamideimide, polyetherimide and rayon.

The preferable configuration of winding the cathode foil 3, the anode foil 4 and the separator 2 is as shown in FIG. 3, wherein the cathode foil 3 is arranged most peripheral so that heat radiation performance is enhanced. For this reason, the separator 2, the anode foil 4, the separator 2 and the cathode 3 are placed on a roller axis in this order whereby these components are wound about the roller axis in this order. When the end of the anode foil 4 is placed in alignment with that of the cathode foil 3 before winding, the inner periphery of the other end of the anode foil 4 located in the center of the capacitor element 1 does not face with any portion of the anode foil 3, whereby the dispersion of voltage toward the cathode foil 3 becomes unequal. Hence, it is preferable to place the cathode foil 3 on the roller axis so that the anode foil 4 precedes the cathode foil 3 by a predetermined distance, and to rotate said roller axis by a predetermined frequency, and then to place the anode foil 4 on the roller axis for winding. When the cathode and anode foils 3 and 4 have a generally similar width, some misalignment takes place during the winding process, and some portion of the anode foil 4 does not face with any portion of the cathode foil 3. In order to prevent this, it is preferable to have the cathode foil 3 made wider than the anode foil 4 by 10% or more. Further, when housing the capacitor element in the outer casing, an additional separator segment is disposed on the interior bottom face of the outer casing in such a manner that the low-density plane thereof is arranged to face with the capacitor element, where the separator segment can retain the electrolyte so that the electrolyte can be optionally supplied to the capacitor element.

Meanwhile, the capacitor element 1 formed by way of winding or lamination as described above is impregnated with the electrolyte whose pH range is from 5 to 7. Examples of the solvent for the electrolyte include protic polar solvent, aprotic polar solvent, water and mixtures thereof. Examples of the protic polar solvent include monohydric alcohols (such as ethanol, propanol, butanol, pentanol, hexanol, cyclobutanol, cyclopentanol, cyclohexanol and benzyl alcohol), and polyvalent alcohols and oxyalcohol compounds (such as ethylene glycol, propylene glycol, glycerin, methyl cellosolve, ethyl cellosolve, methoxypropylene glycol and dimethoxy propanol). Moreover, the representative examples of aprotic polar solvent include amide series (such as N-methylformamide, N,N-dimethylformamide, N-ethylformamide, N,N-diethylformamide, N-methyl acetamide, N,N-dimethyl acetamide, N-ethyl acetamide, N,N-diethyl acetamide, hexamethylphosphoric amide); lactone compounds (such as [gamma]-butyrolactone, [delta]valerolactone, [gamma]-valerolactone); sulfolane series (such as 3-methyl sulfolane, 2,4-dimethyl sulfolane); cyclic amide compounds (such as N-methyl-2-pyrrolidone, ethylene carbonate, propylene carbonate, isobutylene carbonate); nitrile compound (such as acetonitrile); oxide compound (such as dimethyl sulfoxide); 2-imidazolidinone solvents [for example, 1,3-dialkyl-2-imidazolidinone (such as 1,3-dimethyl-2-imidazolidinone, 1,3-diethyl-2-imidazolidinone, 1,3-di(n-propyl)-2-imidazolidinone); and 1,3,4-trialkyl-2-imidazolidinone (such as 1,3,4-trimethyl-2-imidazolidinone)], and the like. Among all, a solution of at least one material selected from the group consisting of water, sulfolane and [gamma]-butyrolactone is preferably used as a single or a mixed solution.

Still further, the solute contained in the electrolyte includes quaternary salts such as ammonium salt, amine salt, quaternary ammonium salt and cyclic amidin compound, where the quaternary salts are typically used in the electrolytic solution for an aluminum electrolytic capacitor and have the acid conjugated bases as anionic component. Examples of a quaternary ammonium constituting the quaternary ammonium salt include a tetraalkylammonium (such as tetramethylammonium, tetraethyl ammonium, tetrapropylammonium, tetrabutylammonium, methyltriethylammonium, dimethyldiethylammonium) and a pyridinium (such as 1-methylpyridinium, 1-ethylpyridinium, 1,3-diethylpyridinium). Examples of an amine constituting the amine salt include a primary amine (such as methylamine, ethylamine, propylamine, butylamine, ethylenediamine, monoethanolamine); secondary amine (such as dimethylamine, diethylamine, dipropylamine, ethylmethylamine, diphenylamine, diethanolamine); and tertiary amine (such as trimethylamine, triethylamine, tributylamine, 1,8-diazabicyclo(5,4,0)-undecene-7, triethanolamine).

Using an amine salt, among all these, the film characteristics of chemical formed coating are improved; especially improved are the film characteristics for charge/discharge with great voltage difference.

Still further, examples of anion component contained in an electrolyte include: organic acids such as adipic acid, glutaric acid, succinic acid, benzoic acid, isophthalic acid, phthalic acid, terephthalic acid, maleic acid, toluic acid, enanthic acid, malonic acid, formic acid, decanedicarboxylic acids such as 1,6-decanedicarboxylic acid and 5,6-decanedicarboxylic acid, octanedicarboxylic acids such as 1,7-octanedicarboxylic acid, azelaic acid and sebacic acid; boric acid, and boric acid polyvalent alcohol complex compound obtained from boric acid and polyvalent alcohol; and inorganic acid conjugated bases such as phosphoric acid, carbonic acid and silicic acid. Among all these, the most preferable are organic carboxylic acids such as decanedicarboxylic acid, octanedicarboxylic acid, azelaic acid, sebacic acid, adipic acid, glutaric acid, succinic acid, benzoic acid, isophthalic acid and formic acid; or boric acid, and boric acid polyvalent alcohol complex compound.

In order to produce an anode foil, a metal foil for an electrolytic capacitor can be energized in an acidic solution, be etched for securing an enlarged surface area, and be treated with an anodic oxidation in an electrolytic solution consisting of phosphoric acid and boric acid or in a solution of salts of these two acids so that the metal foil has a chemical formed oxide coating thereon. When such an anode foil has a chemical formed coating comprised of an evenly crystallized layer formed on the aluminum and a silicon-containing layer formed on the evenly crystallized layer, the film characteristics of the chemical formed coating are improved; especially improved are the film characteristics for charge/discharge with great voltage difference.

FIRST EXAMPLE

Following is the description of the First Example of Embodiment 1 of the electrolytic capacitor according to the present invention.

Working Example 1

The cathode internal terminal comprises an aluminum material having a degree of purity of 99.9% or greater, and has a chemical formed coating formed thereon at an alternating current etching magnification of 28 times and anodic oxidation voltage of 3V, where the iron concentration is 40 ppm. The anode internal terminal comprises an aluminum material having a degree of purity of 99.9% or greater, and has a chemical formed coating formed thereon at an anodic oxidation voltage of 620V. The cathode foil has a chemical formed coating formed thereon at an etching magnification of 28 times and anodic oxidation voltage of 3V, whereas the anode foil is etched and has a chemical formed coating formed thereon at an anodic oxidation voltage of 620V. After each of said two internal terminals was provided to the predetermined place on each electrode foil by way of stitch welding, respectively, a capacitor element was formed by winding in such a manner that the low-density plane of the separator would face with the cathode internal terminal, and then the capacitor element was impregnated with an electrolyte of pH6 and was housed in the outer casing.

Working Example 2

Another electrolytic capacitor was produced, wherein the alternating current etching magnification was 10 times, and wherein no anodic oxidation was conducted. The other features were the same as in Working Example 1.

Working Example 3

Still another electrolytic capacitor was produced wherein the iron content in the etching layer of the cathode internal terminal was 280 ppm. The other features were the same as in Working Example 1.

Comparative Example 1

Yet still another electrolytic capacitor was produced wherein the aluminum material comprising the cathode internal terminal had a degree of purity of 99% or greater, and wherein the iron content in the etching layer thereof was 400 ppm. The other features were the same as in Working Example 1.

Subsequently, a charge/discharge test of the electrolytic capacitors of Working Examples 1 to 3 and Comparative Example 1 was conducted wherein the voltage difference is 200V, namely, 400V-200V, and at 3 Hz. The test results are shown in Table 1 below. The iron concentration was measured on the basis of the iron concentration in the lysate after the etching layer 8 of the cathode internal terminal, excluding the cored bar section 9, was dissolved with sulphuric acid or nitric acid etc.

TABLE 1

| | Cathode Internal Terminal | | | | Results | |
| --- | --- | --- | --- | --- | --- | --- |
| | Al purity | Fe Purity | Etching Magnification | Formation Voltage | Short Circuit | pH of Electrolyte around Cathode Internal Terminal |
| WE1 | 99.9% | 40 ppm | 28 times | 3 V | Test OK at 50 millionth time | pH 6.5~7.2 |
| WE2 | 99.9% | 40 ppm | 10 times | — | Test OK at 50 millionth time | pH 7.2~8.0 |
| WE3 | 99.9% | 150 ppm | 28 times | 3 V | Test OK at 50 millionth time | pH 7.2~8.0 |
| WE4 | 99.9% | 280 ppm | 28 times | 3 V | Short circuit at 15 millionth time | — |

TABLE 1-continued

| | Cathode Internal Terminal | | | | Results | |
|---|---|---|---|---|---|---|
| | Al purity | Fe Purity | Etching Magnification | Formation Voltage | Short Circuit | pH of Electrolyte around Cathode Internal Terminal |
| CE1 | 99% | 400 ppm | 28 times | 3 V | Short circuit at 2.5 millionth time | — |

Note:
WE = Working Example,
CE = Comparative Example

As shown in Table 1, the electrolytic capacitors in Working Examples 1 to 3 did not exhibit any short circuit even after the charge/discharge test for 50 million times, and the capacitor in Working Example 4 could stand up to 15 million times of charge/discharge in the test, whereas the capacitor in Comparative Example 1 exhibited a short circuit at 2.5 million times of charge/discharge in the test. The electrolytic capacitors in Working Examples 1 to 3 were disassembled, and the pH values of the electrolyte around the cathode internal terminal were measured. Working Examples 2 and 3 exhibited that the pH values were rather closer to the alkali side in comparison with Working Example 1, and some tarnish was observed in the area adjacent to the cathode terminal.

Embodiment 2

As shown in FIG. 1, in the electrolytic capacitor according to the present invention, the anode foil 4 comprises an aluminum foil that is etched to have a chemical formed coating, while the cathode foil 3 comprises an aluminum foil that is etched to optionally have a chemical formed coating. Each of these two electrode foils has an interface section 7 welded thereto by way of stitching and cold welding methods, where the interface section 7 is a part of an electrode internal terminal comprising, for example, an internal tab terminal made of aluminum etc. and having an elongated foil shape, and a lead terminal comprising a round bar section, a flattened section and a leading section connected to said round bar section. Said anode foil 4, said cathode foil 3 and a separator 2 placed therebetween are wound or laminated to form a capacitor element 1. Said separator 2 comprises cellulose fiber paper, mixed paper including the cellulose fiber paper, and laminated paper; where the cellulose fiber paper includes at least one material selected from the group consisting of Manila fiber, kraft, hemp, esparto and cotton. The examples of material for the separator include synthetic resins such as polyethylene terephthalate, polybutylene terephthalate, polyphenylene sulfide, nylon, aromatic polyamide, polyamide, polyamideimide, polyetherimide and rayon.

In the electrolytic capacitor according to the present invention, the cathode foil 3 firstly starts being wound and then the anode foil 4 is wound together, and, as shown in FIG. 1, the end of the cathode foil 3 comes at the winding end portion, whereby the end of the anode foil 4 faces with the cathode foil 3. Further, the cathode internal terminal is etched so that the surface area of the cathode internal terminal facing with the anode foil is enlarged; namely, the area of the portion of the cathode section facing with the anode foil is enlarged.

The inventive effects can be achieved so long as the etching treatment is provided to the cathode internal terminal for enlarged surface area thereof, wherein the etching magnification of the cathode internal terminal is greater than that of the cathode foil preferably by at least 5%; more preferably by at least 35%. The cathode internal terminal can have a chemical formed coating formed thereon.

The anode internal terminal 6 comprises aluminum, and a chemical formed coating is formed on the surface thereof by way of anodic oxidation treatment. Preferably, the anodic oxidation treatment voltage applied to the anode internal terminal 6 is nearly equal to that applied to the anode foil 4.

Meanwhile, the capacitor element 1 formed by way of winding or lamination as described above is impregnated with the electrolyte. The pH range of the electrolyte is preferably 5 to 7. Examples of the solvent for the electrolyte include protic polar solvent, aprotic polar solvent, water and mixtures thereof. Examples of the protic polar solvent include monohydric alcohols (such as ethanol, propanol, butanol, pentanol, hexanol, cyclobutanol, cyclopentanol, cyclohexanol and benzyl alcohol), and polyvalent alcohols and oxyalcohol compounds (such as ethylene glycol, propylene glycol, glycerin, methyl cellosolve, ethyl cellosolve, methoxypropylene glycol and dimethoxy propanol). Moreover, the representative examples of aprotic polar solvent include amide series (such as N-methylformamide, N,N-dimethylformamide, N-ethylformamide, N,N-diethylformamide, N-methyl acetamide, N,N-dimethyl acetamide, N-ethyl acetamide, N,N-diethyl acetamide, hexamethylphosphoric amide); lactone compounds (such as [gamma]-butyrolactone, [delta]valerolactone, [gamma]-valerolactone); sulfolane series (such as 3-methyl sulfolane, 2,4-dimethyl sulfolane); cyclic amide compounds (such as N-methyl-2-pyrrolidone, ethylene carbonate, propylene carbonate, isobutylene carbonate); nitrile compound (such as acetonitrile); oxide compound (such as dimethyl sulfoxide); 2-imidazolidinone solvents [for example, 1,3-dialkyl-2-imidazolidinone (such as 1,3-dimethyl-2-imidazolidinone, 1,3-diethyl-2-imidazolidinone, 1,3-di(n-propyl)-2-imidazolidinone); and 1,3,4-trialkyl-2-imidazolidinone (such as 1,3,4-trimethyl-2-imidazolidinone)], and the like. Among all, a solution of at least one material selected from the group consisting of water, sulfolane and [gamma]-butyrolactone is preferably used as a single or a mixed solution.

In addition, the solute contained in the electrolyte includes quaternary salts such as ammonium salt, amine salt, quaternary ammonium salt and cyclic amidin compound, where the quaternary salts are typically used in the electrolytic solution for an aluminum electrolytic capacitor and have the acid conjugated bases as anionic component. Examples of a quaternary ammonium constituting the quaternary ammonium salt include a tetraalkylammonium (such as tetramethylammonium, tetraethyl ammonium, tetrapropylammonium, tetrabutylammonium, methyltriethylammonium, dimethyldiethylammonium) and a pyridinium (such as 1-methylpyridinium, 1-ethylpyridinium, 1,3-diethylpyridinium). Examples of an amine constituting the amine salt include primary amine (such as methylamine, ethylamine, propylamine, butylamine, ethylenediamine, monoethanolamine); secondary amine (such as dimethylamine, diethylamine, dipropylamine, ethylmethylamine, diphenylamine, diethanolamine); and tertiary amine (such as trimethylamine, triethylamine, tributylamine, 1,8-diazabicyclo(5,4,0)-undecene-7, triethanolamine).

Using an amine salt, among all these, the film characteristics of chemical formed coating are improved; especially improved are the film characteristics for charge/discharge with great voltage difference.

Still further, examples of anion component contained in an electrolyte include: organic acids such as adipic acid, glutaric acid, succinic acid, benzoic acid, isophthalic acid, phthalic acid, terephthalic acid, maleic acid, toluic acid, enanthic acid, malonic acid, formic acid, decanedicarboxylic acids such as 1,6-decanedicarboxylic acid and 5,6-decanedicarboxylic acid, octanedicarboxylic acids such as 1,7-octanedicarboxylic acid, azelaic acid and sebacic acid; boric acid, and boric acid polyvalent alcohol complex compound obtained from boric acid and polyvalent alcohol; and inorganic acid conjugated bases such as phosphoric acid, carbonic acid and silicic acid. Among all these, the most preferable are organic carboxylic acids such as decanedicarboxylic acid, octanedicarboxylic acid, azelaic acid, sebacic acid, adipic acid, glutaric acid, succinic acid, benzoic acid, isophthalic acid and formic acid; or boric acid, and boric acid polyvalent alcohol complex compound.

In order to produce an anode foil, a metal foil for an electrolytic capacitor can be energized in an acidic solution, be etched for securing an enlarged surface area, and be treated with an anodic oxidation in an electrolytic solution consisting of phosphoric acid and boric acid or in a solution of salts of these two acids so that the metal foil has a chemical formed oxide coating thereon. When such an anode foil has a chemical formed coating comprised of an evenly crystallized layer formed on the aluminum and a silicon-containing layer formed on the evenly crystallized layer, the film characteristics of the chemical formed coating are improved; especially improved are the film characteristics for charge/discharge with great voltage difference.

SECOND EXAMPLE

The present invention is described in more detail with reference to the Second Example relating to Embodiment 2 as described below.

Working Example 4

The cathode internal terminal comprises an aluminum material having a degree of purity of 99.9% or greater, and is provided with an enlargement treatment with its etching magnification of 9 times. The anode internal terminal comprises an aluminum material having a degree of purity of 99.9% or greater, and has a chemical formed coating formed thereon at an anodic oxidation voltage of 620V. The cathode foil is provided with an enlargement treatment at an etching magnification of 28 times, whereas the anode foil is etched and has a chemical formed coating formed thereon at an anodic oxidation voltage of 620V. After each of said two internal terminals was provided to the predetermined place on each electrode foil by way of cold welding, respectively, a capacitor element was formed by winding in such a manner that the separator (50 µm thick, 0.75 g/cm³ dense) would be placed between the two foils and that the cathode foil firstly would start being wound so that the end of the cathode foil would come at the winding end portion, whereby the capacitor element was impregnated with an electrolyte with the solvent thereof being ethylene glycol and with the solute thereof being ammonium borate, and was housed in the outer casing.

Working Example 5

An electrolytic capacitor was produced in a manner similar to Working Example 4, using an electrolyte with the solvent thereof being ethylene glycol and with the solute being azelaic acid diethylamine.

Working Example 6

An electrolytic capacitor was produced in a manner similar to Working Example 4, using an anode foil having a chemical formed coating comprised of an evenly crystallized layer formed on the aluminum and a silicon-containing layer formed on the evenly crystallized layer.

Working Example 7

An electrolytic capacitor was produced in a manner similar to Working Example 4, using an electrolyte with the solvent thereof being ethylene glycol and with the solute being azelaic acid diethylamine, and using an anode foil having a chemical formed coating comprised of an evenly crystallized layer formed on the aluminum and a silicon-containing layer formed on the evenly crystallized layer.

Working Example 8

An electrolytic capacitor was produced in a manner similar to Working Example 4, and the capacitor element was wound, with a separator of 40 nm thick, 0.75 g/cm³ dense being used, so that the longitudinal end of the anode foil would face with the cathode foil; in other words, so that the entire surface of the anode foil would face with, and lie on top of, the cathode foil.

Comparative Example 2

An electrolytic capacitor was produced as in Working Example 4, wherein no etching treatment was provided to the cathode internal terminal Comparative Example 3

An electrolytic capacitor was produced as in Working Example 4, so that the anode foil firstly would start being wound and that the end of the anode foil would come at the winding end portion.1

Subsequently, a charge/discharge test of the electrolytic capacitors of Working Examples and Comparative Examples was conducted wherein the voltage difference is 200V, namely, 400V-200V, and at 3 Hz (Charge/Discharge Test 1), and the generation of short circuit was studied. In addition, another charge/discharge test was conducted wherein the voltage difference is 280V, namely, 280V-0V, and at 1 Hz (Charge/Discharge Test 2), and the number of times of the leakage current reaching 1000 µA was studied. The test result is shown in Table 2 below.

TABLE 2

| | Charge/Discharge Test 1 | Charge/Discharge Test 2 |
|---|---|---|
| WE4 | Test OK at 50 millionth time | 1.5 millionth time |
| WE5 | Test OK at 50 millionth time | Not reached 1000 µA at 50 millionth time |
| WE6 | Test OK at 50 millionth time | Not reached 1000 µA at 50 millionth time |
| WE7 | Test OK at 50 millionth time | Not reached 1000 µA at 50 millionth time |
| WE8 | Test OK at 50 millionth time | Not reached 1000 µA at 50 millionth time |
| CE2 | Short circuit at 3.5 millionth time | — |
| CE3 | Short circuit at 1 millionth time | — |

Note:
WE = Working Example, CE = Comparative Example

As is apparent from Table 2, when the Charge/Discharge Test 1 was conducted in Comparative Example 2 wherein the cathode foil firstly started being wound so that the end of the cathode foil would come at the winding end portion, a short circuit took place at the 3.5 millionth charge/discharge; while in Comparative Example 3 wherein the cathode internal terminal was etched, a short circuit took place at the 1 millionth charge/discharge, much earlier than Comparative Example 2. On the contrary, in Working Example 4, wherein these two measures were employed, no short circuit took place, which demonstrated the significant effects of the present invention.

Further, the leakage current characteristics were improved when the Charge/Discharge Test 2 was conducted both in Working Example 5 wherein an electrolytic solution containing amine salt was additionally applied to Working Example 4, and in Working Example 6 which applied an anode foil having a chemical formed coating comprised of an evenly crystallized layer formed on the aluminum and a silicon-containing layer formed on the evenly crystallized layer.

Besides, no short circuit took place in Working Example 8 wherein an acceleration test was carried out using a separator thinner than a typical one, which also demonstrated the significant effects of the present application.

What is claimed is:

1. An electrolytic capacitor provided with a capacitor element in which an anode foil having an anode internal terminal and a cathode foil having a cathode internal terminal with its purity greater or equal to 99.9% are wound or laminated through a separator, the capacitor element being impregnated with an electrolyte, wherein
    at the beginning of the winding only the cathode foil firstly starts being wound and then the anode foil is wound together so that the winding start edge of the cathode foil exists beyond the winding start edge of the anode foil along the winding direction, and at the end of the winding the cathode foil is wound beyond the winding end of the anode foil so that only the cathode foil comes at the winding end portion along the winding direction,
    said cathode foil is performed with an etching treatment and said cathode internal terminal is comprised of a lysis-treated aluminum performed with an etching magnification greater or equal to 5% of said etching treatment performed for said cathode foil,
    the iron concentration in the lysis-treated layer formed through said lysis treatment is less than 40 ppm and the alkalization of a driving electrolysis when it is being charged or discharged is prevented, and
    the capacitor element is impregnated with the electrolyte, and wherein the electrolyte contains an amine salt.

2. The electrolytic capacitor according to claim 1, wherein an end of the anode foil faces the cathode foil through said separator, and wherein a surface area of the cathode internal terminal is provided with an enlargement treatment.

3. The electrolytic capacitor according to claim 1, wherein the entire surface of the anode foil faces the cathode foil through the separator.

4. The electrolytic capacitor according to claim 1, wherein said cathode internal terminal has a chemical formed coating thereon.

5. The electrolytic capacitor according to claim 1, wherein the pH range of said electrolyte is from 5 to 7.

6. The electrolytic capacitor according to claim 1, wherein said separator comprises kraft, hemp or cotton.

7. An electrolytic capacitor provided with a capacitor element in which an anode foil having an anode internal terminal and a cathode foil having a cathode internal terminal with its purity greater or equal to 99.9% are wound or laminated through a separator, the capacitor element being impregnated with an electrolyte, wherein
    at the beginning of the winding only the cathode foil firstly starts being wound and then the anode foil is wound together, and at the end of the winding the cathode foil is wound beyond the winding end of the anode foil so that only the cathode foil comes at the winding end portion,
    said cathode foil is performed with an etching treatment and said cathode internal terminal is comprised of a lysis-treated aluminum performed with an etching magnification greater or equal to 5% of said etching treatment performed for said cathode foil,
    the iron concentration in the lysis-treated layer formed through said lysis treatment is less than 40ppm and the alkalization of a driving electrolysis when it is being charged or discharged is prevented, and
    the anode foil comprises a chemical formed coating comprised of an evenly crystallized layer and a silicon containing layer formed on the evenly crystallized layer.

8. The electrolytic capacitor according to claim 7, wherein an end of the anode foil faces the cathode foil through said separator, and wherein a surface area of the cathode internal terminal is provided with an enlargement treatment.

9. The electrolytic capacitor according to claim 7, wherein the entire surface of the anode foil faces the cathode foil through the separator.

10. The electrolytic capacitor according to claim 7, wherein said cathode internal terminal has a chemical formed coating thereon.

11. The electrolytic capacitor according to claim 7, wherein the pH range of said electrolyte is from 5 to 7.

12. The electrolytic capacitor according to claim 7, wherein said separator comprises kraft, hemp or cotton.

* * * * *